(12) United States Patent
Friedman et al.

(10) Patent No.: US 7,707,284 B2
(45) Date of Patent: Apr. 27, 2010

(54) SYSTEM AND METHOD OF SEARCHING FOR CLASSIFYING USER ACTIVITY PERFORMED ON A COMPUTER SYSTEM

(75) Inventors: Nathaniel Dourif Friedman, Boston, MA (US); Jon Eric Trowbridge, Chicago, IL (US)

(73) Assignee: Novell, Inc., Provo, UT (US)

( * ) Notice: Subject to any disclaimer, the term of this patent is extended or adjusted under 35 U.S.C. 154(b) by 953 days.

(21) Appl. No.: 11/471,631

(22) Filed: Jun. 21, 2006

(65) Prior Publication Data

US 2007/0033187 A1 Feb. 8, 2007

Related U.S. Application Data

(63) Continuation-in-part of application No. 11/229,628, filed on Sep. 20, 2005, now Pat. No. 7,440,948, and a continuation-in-part of application No. 11/195,754, filed on Aug. 3, 2005, now Pat. No. 7,184,939, and a continuation-in-part of application No. 11/195,731, filed on Aug. 3, 2005.

(60) Provisional application No. 60/706,009, filed on Aug. 8, 2005.

(51) Int. Cl.
*G06F 15/173* (2006.01)
*G06F 17/30* (2006.01)

(52) U.S. Cl. .......................................... 709/224; 707/6
(58) Field of Classification Search .................. 709/224; 707/6

See application file for complete search history.

(56) References Cited

U.S. PATENT DOCUMENTS

| | | | |
|---|---|---|---|
| 4,897,782 A | 1/1990 | Bennett et al. | 364/200 |
| 5,287,504 A | 2/1994 | Carpenter et al. | 395/600 |
| 5,355,484 A * | 10/1994 | Record et al. | 717/127 |
| 5,577,241 A | 11/1996 | Spencer | 395/605 |
| 5,864,848 A | 1/1999 | Horvitz et al. | 707/6 |
| 6,081,750 A | 6/2000 | Hoffberg et al. | 700/17 |
| 6,272,455 B1 | 8/2001 | Hoshen et al. | 704/1 |
| 6,272,507 B1 | 8/2001 | Pirolli et al. | 707/513 |
| 6,349,137 B1 | 2/2002 | Hunt et al. | 379/265.06 |
| 6,400,996 B1 | 6/2002 | Hoffberg et al. | 700/83 |
| 6,421,737 B1 * | 7/2002 | Stone et al. | 719/318 |
| 6,480,881 B1 | 11/2002 | Kubota et al. | 709/202 |
| 6,484,203 B1 * | 11/2002 | Porras et al. | 709/224 |
| 6,611,877 B2 * | 8/2003 | Korn et al. | 719/318 |

(Continued)

OTHER PUBLICATIONS

Microsoft Corporation. "How to Use the Event Logging Utility (Logevent.exe) to Create and Log Custom Events in Event Viewer in Windows 2000", Article 315410, Jul. 15, 2009, 3 pages.*

(Continued)

*Primary Examiner*—George C Neurauter, Jr.
(74) *Attorney, Agent, or Firm*—Pillsbury Winthrop Shaw Pittman LLP

(57) ABSTRACT

The invention is directed to a system and method of managing information associated with user actions. A monitoring system may gather and store information associated with user actions. Relationships may be inferred between user actions based on time or other criteria. A user may define classifications of user actions. These classifications may be used to retrieve information associated with user actions.

16 Claims, 5 Drawing Sheets

U.S. PATENT DOCUMENTS

| | | | | |
|---|---|---|---|---|
| 6,629,106 | B1 * | 9/2003 | Narayanaswamy et al. | 707/104.1 |
| 6,647,383 | B1 | 11/2003 | August et al. | 707/3 |
| 6,735,602 | B2 * | 5/2004 | Childress et al. | 707/200 |
| 6,775,665 | B1 | 8/2004 | Piersol | 707/4 |
| 6,931,593 | B1 | 8/2005 | Grooters | 715/717 |
| 6,996,778 | B2 | 2/2006 | Rajarajan et al. | 715/734 |
| 7,146,416 | B1 * | 12/2006 | Yoo et al. | 709/224 |
| 7,155,514 | B1 * | 12/2006 | Milford | 709/225 |
| 7,184,939 | B1 | 2/2007 | Trowbridge et al. | 702/193 |
| 7,188,317 | B1 | 3/2007 | Hazel | 715/804 |
| 7,213,040 | B1 | 5/2007 | Stokes et al. | 707/203 |
| 7,437,358 | B2 | 10/2008 | Arrouye et al. | 707/4 |
| 7,440,948 | B2 | 10/2008 | Trowbridge et al. | 707/7 |
| 7,487,146 | B2 | 2/2009 | Friedman | 707/4 |
| 7,502,798 | B2 | 3/2009 | Trowbridge et al. | 707/10 |
| 7,526,478 | B2 | 4/2009 | Friedman | 707/6 |
| 7,539,673 | B2 | 5/2009 | Trowbridge | 707/3 |
| 7,552,445 | B2 * | 6/2009 | Green | 719/318 |
| 2002/0068558 | A1 | 6/2002 | Janik | 455/422 |
| 2002/0069059 | A1 | 6/2002 | Smith | 704/257 |
| 2002/0087649 | A1 | 7/2002 | Horvitz | 709/207 |
| 2002/0143860 | A1 | 10/2002 | Catan | 709/203 |
| 2002/0147805 | A1 | 10/2002 | Leshem et al. | 709/223 |
| 2002/0174134 | A1 | 11/2002 | Goykhman | 707/104.1 |
| 2003/0018634 | A1 | 1/2003 | Shringeri et al. | 707/4 |
| 2003/0099399 | A1 | 5/2003 | Zelinski | 382/186 |
| 2004/0030753 | A1 | 2/2004 | Horvitz | 709/206 |
| 2004/0049494 | A1 | 3/2004 | Kottisa | 707/3 |
| 2004/0049512 | A1 | 3/2004 | Kawakita | 707/100 |
| 2004/0117802 | A1 * | 6/2004 | Green | 719/318 |
| 2005/0114374 | A1 | 5/2005 | Juszkiewicz et al. | 707/101 |
| 2005/0188174 | A1 | 8/2005 | Guzak et al. | 711/203 |
| 2006/0010120 | A1 | 1/2006 | Deguchi et al. | 707/4 |
| 2006/0031199 | A1 | 2/2006 | Newbold et al. | 707/3 |
| 2006/0156246 | A1 | 7/2006 | Williams et al. | 715/764 |
| 2006/0178898 | A1 * | 8/2006 | Habibi | 705/1 |
| 2006/0221235 | A1 | 10/2006 | Kusumoto | 348/553 |
| 2006/0224938 | A1 | 10/2006 | Fikes et al. | 715/500 |
| 2007/0033220 | A1 | 2/2007 | Drucker et al. | 707/103 R |
| 2007/0039049 | A1 * | 2/2007 | Kupferman et al. | 726/22 |
| 2007/0094292 | A1 | 4/2007 | Kataoka | 707/102 |

OTHER PUBLICATIONS

Adiscon GmbH. "MonitorWare Agent 3.0", software documented publisly released Apr. 4, 2005, 224 pages.*

Adiscon GmbH. "MonitorWare Console 3.0", software documented publicly released Oct. 14, 2006, 124 pages.*

Adiscon GmbH, "MonitorWare Console Sample System Status Report", 2003, 10 pages.*

Otto Bruggeman, [Patch] kdirwatch.cpp, Sep. 21, 2002, kde-core-devel list http://lists.kde.org/?l=kde-core-devel&m=103265283012353&w=2, 2 pages.

Josef Weidendorfer, Re:[Patch] kdirwatch.cpp, Sep. 23, 2002, kde-core-devel list http://lists.kde.org/?l=kde-core-devel&m=103279747704133&w=2, 1 page.

Sven Radej, "class KDirWatch", 2003, <http://api.kde.org/3.1-api/classref/kio/KDirWatch.html>.

Microsoft, Outlook 2003 Screenshots, Copyright 2003, 9 pages.

Corbet, "Watching Filesystem Events with Inotify", Sep. 29, 2004, available online: <http://lwn.net/Articles/104343/>, 5 pages.

* cited by examiner

SYSTEM AND METHOD OF SEARCHING FOR CLASSIFYING USER ACTIVITY PERFORMED ON A COMPUTER SYSTEM

CROSS-REFERENCE TO RELATED APPLICATIONS

This application claims the benefit of U.S. Provisional Application entitled "System and Method of Analyzing a Timeline and Performing Search Functions", No. 60/706,009, filed Aug. 8, 2005, and the present application is also a continuation-in-part of U.S. application Ser. No. 11/195,754 entitled "System and Method of Implementing User Action Monitoring to Automatically Populate Object Launchers", filed Aug. 3, 2005 by Jon Eric Trowbridge and Nathaniel Dourif Friedman; and U.S. application Ser. No. 11/195,731 entitled "System and Method of Searching for Information Based on Prior User Actions", filed Aug. 3, 2005 by Jon Eric Trowbridge and Nathaniel Dourif Friedman; and U.S. application Ser. No. 11/229,628 entitled "System and Method of Associating Objects in Search Results", filed Sep. 20, 2005 by Jon Eric Trowbridge and Nathaniel Dourif Friedman. The entire contents of the above mentioned applications are hereby incorporated by reference for all purposes.

BACKGROUND

1. Field of the Invention

This invention relates to a system and method of monitoring and classifying information corresponding to actions initiated by a user on a computer.

2. Background Information

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications are deficient because they do not enable searching for events and/or objects based on the observed actions.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. Objects may include information such as personal information, user data and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a correlation determining system is provided that analyzes information associated with the user initiated actions that relate to these objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value. In addition, a relationship may be displayed in a timeline along with user initiated actions and computer initiated actions.

According to an embodiment of the invention, a user-defined classification system is provided that allows users to define categories of information associated with user initiated actions. The classification system classifies information associated with user initiated actions according to the categories defined by the user. The information may be retrieved and displayed according to the categories.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
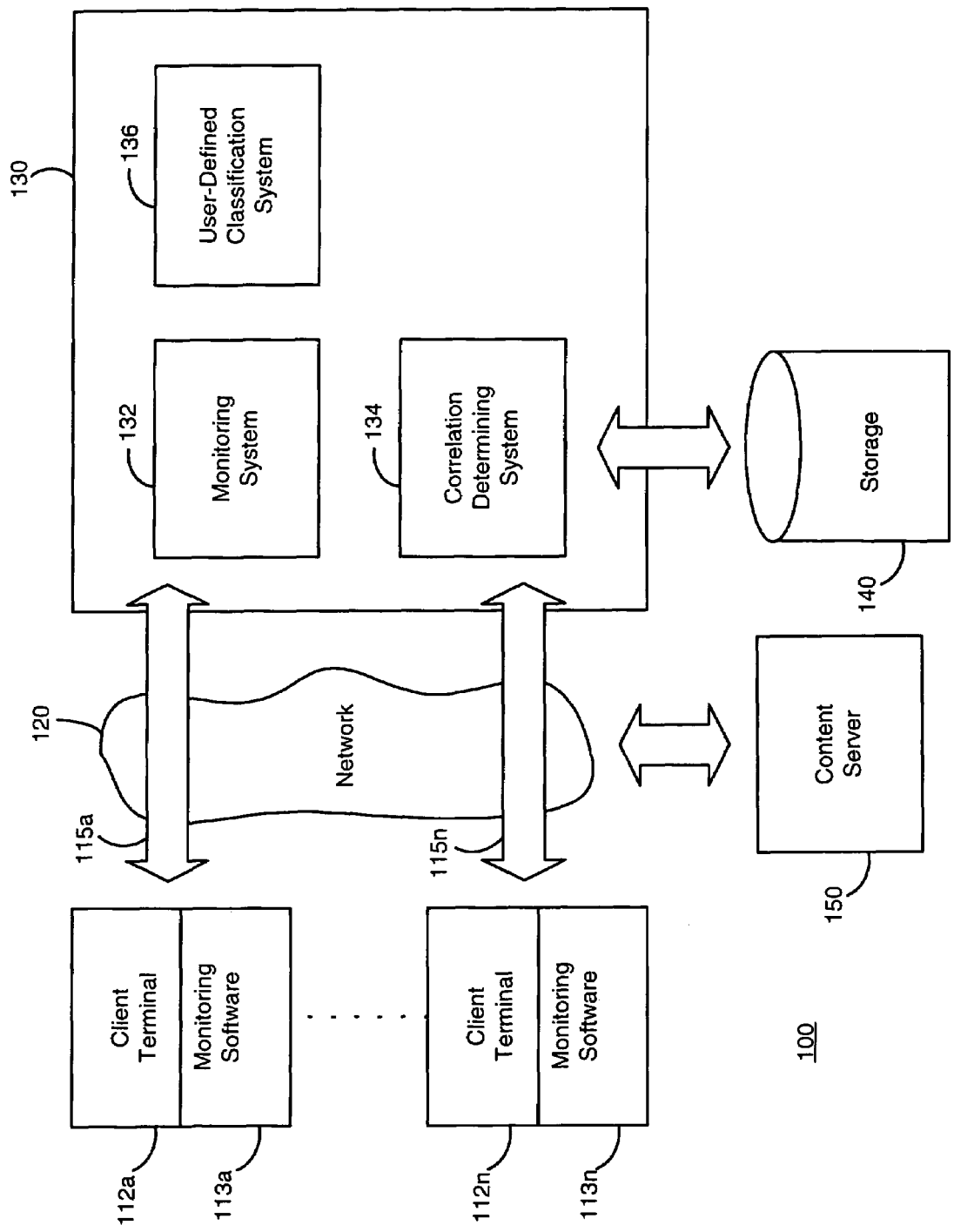
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information such as personal information, user data, or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and/or other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening http://www.novell.com in window 12345," among other actions. One of ordinary skill in the art will readily appreciate that other techniques may be used to gather information associated with the observed user initiated actions and/or computer initiated actions.

According to one embodiment of the invention, user actions are monitored at the application level and/or at the object level. Information regarding the user actions may be stored, including information regarding start/stop times that objects are accessed, a chronological order that objects are accessed, and other events.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, generating a reminder, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
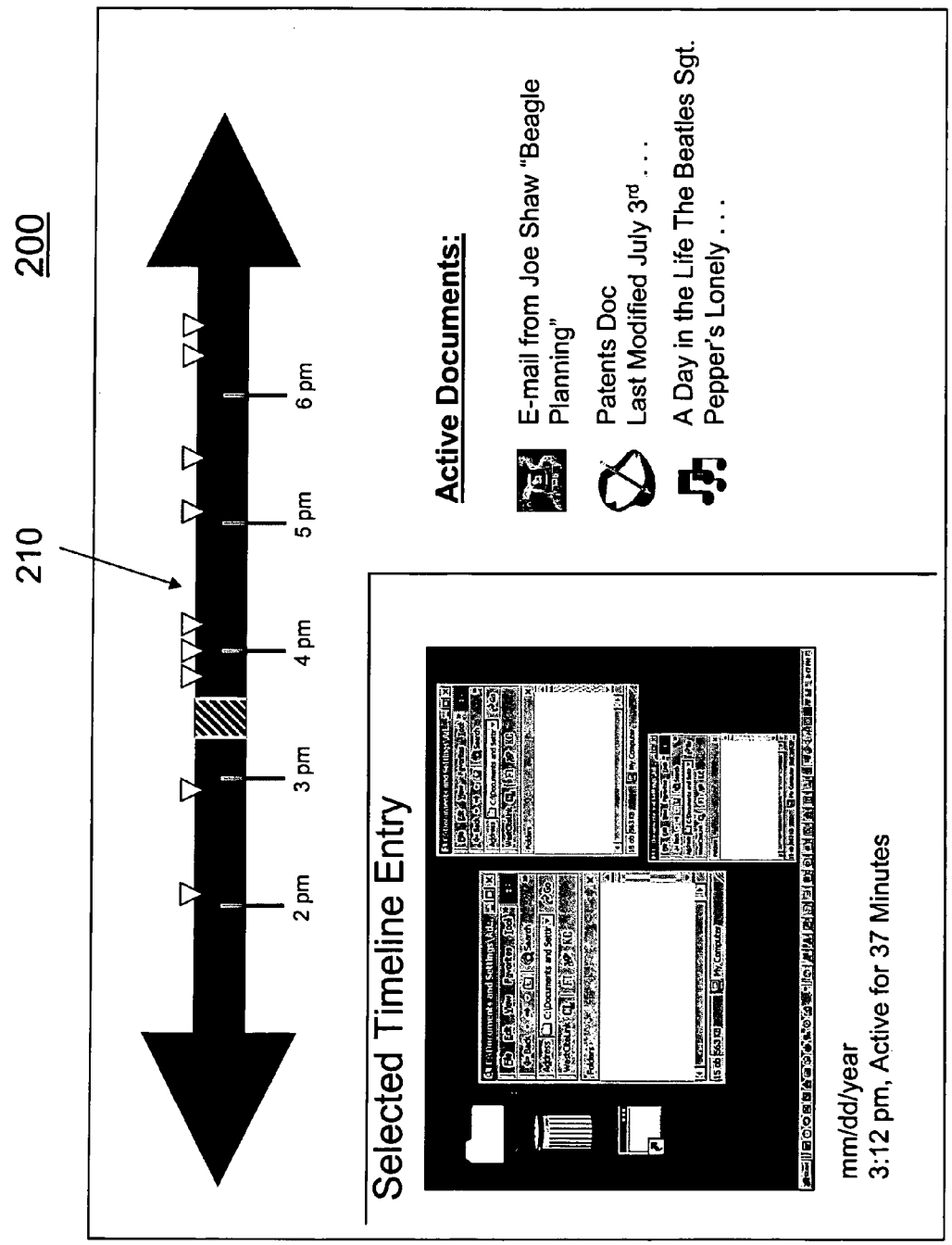
FIG. 2 illustrates an exemplary embodiment of a timeline according to an embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as, screenshots, dates that objects are accessed, times that objects are accessed, lengths of time that objects are active, and/or other information. Display 200 may also include a portion 230 that lists active objects. In another embodiment of the invention, information may be organized and displayed according to other configurations.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3:
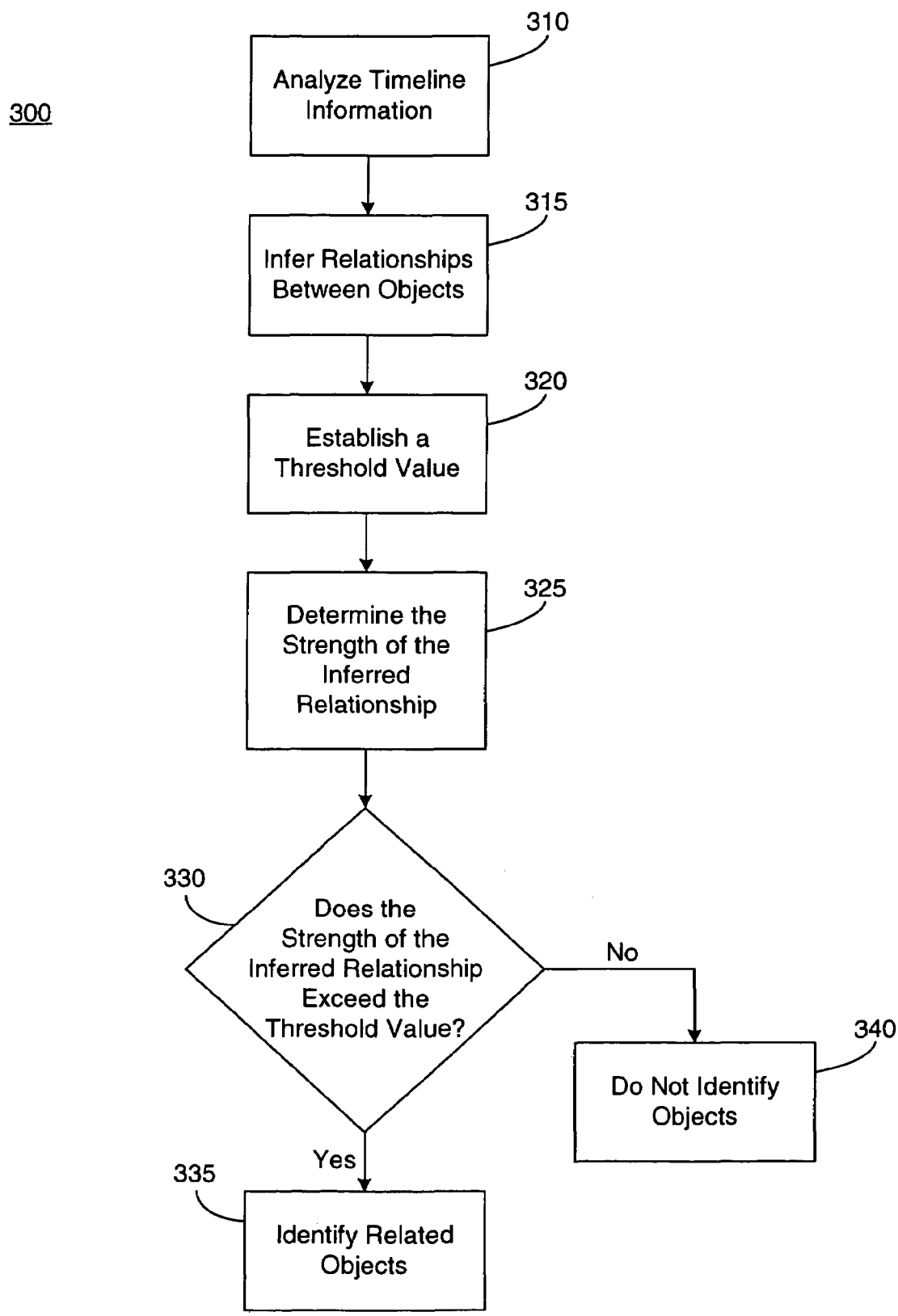
FIG. 3 illustrates a flow chart schematic for analyzing relationships between objects according to an embodiment of the invention.

According to another embodiment of the invention, information corresponding to user initiated actions and computer initiated actions may be analyzed by correlation determining system 134. FIG. 3 illustrates a flow diagram 300 of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters derived from information associated with the user initiated actions relating to these objects including, for example, a temporal order in which the objects are accessed, focus toggling between the first object and the third object, opening the first object contemporaneously with the third object, or other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors associated with the user initiated actions and the computer initiated actions. According to one embodiment of the invention, the relevance may be provided with a value based on factors including, for example, a frequency of the user initiated actions, simultaneous/sequential occurrence of user initiated action, a duration of user initiated actions, overall chronological proximity of user initiated actions, and/or other factors.

In operation 330, the strength of the relationships derived from the factors may be compared to the threshold value. In operation 335, relationships between objects may be identified if the strength of the relationship is determined to exceed a predefined threshold value. The relationship information may be stored as an entry in the chronological time. Alternatively, in step 340, relationships between objects may not be identified if the strength of the relationship is determined to be below a predefined threshold value. One of ordinary skill in the art will readily appreciate that other techniques may be used to determine the strength of relationships between objects. According to another embodiment of the invention, correlation determining system 134 may analyze parameters derived from information associated with user initiated actions and/or computer initiated actions to discover relationships between objects.

According to one embodiment of the invention, correlation determining system 134 may analyze parameters derived from information associated with user initiated actions and/or computer initiated actions to discover relationships between objects. Thus, according to one embodiment of the invention, relationships may be discovered without considering content of the objects. In an alternative embodiment of the invention, a combination of content-searching and an analysis of parameters derived from information associated with user initiated actions and/or computer initiated actions may be used to discover relationships between objects. By contrast, in the example discussed above, known systems that only rely on content-based searching to discover relationships between objects would not identify that the first object (i.e., an email message) is related to the third object (i.e., a word processing document), if the first object and the third object include different content (e.g., terminology).

According to another embodiment of the current invention, a user-defined classification system 136 may classify and retrieve information associated with user actions based upon categories defined by the user.

Figure 4:
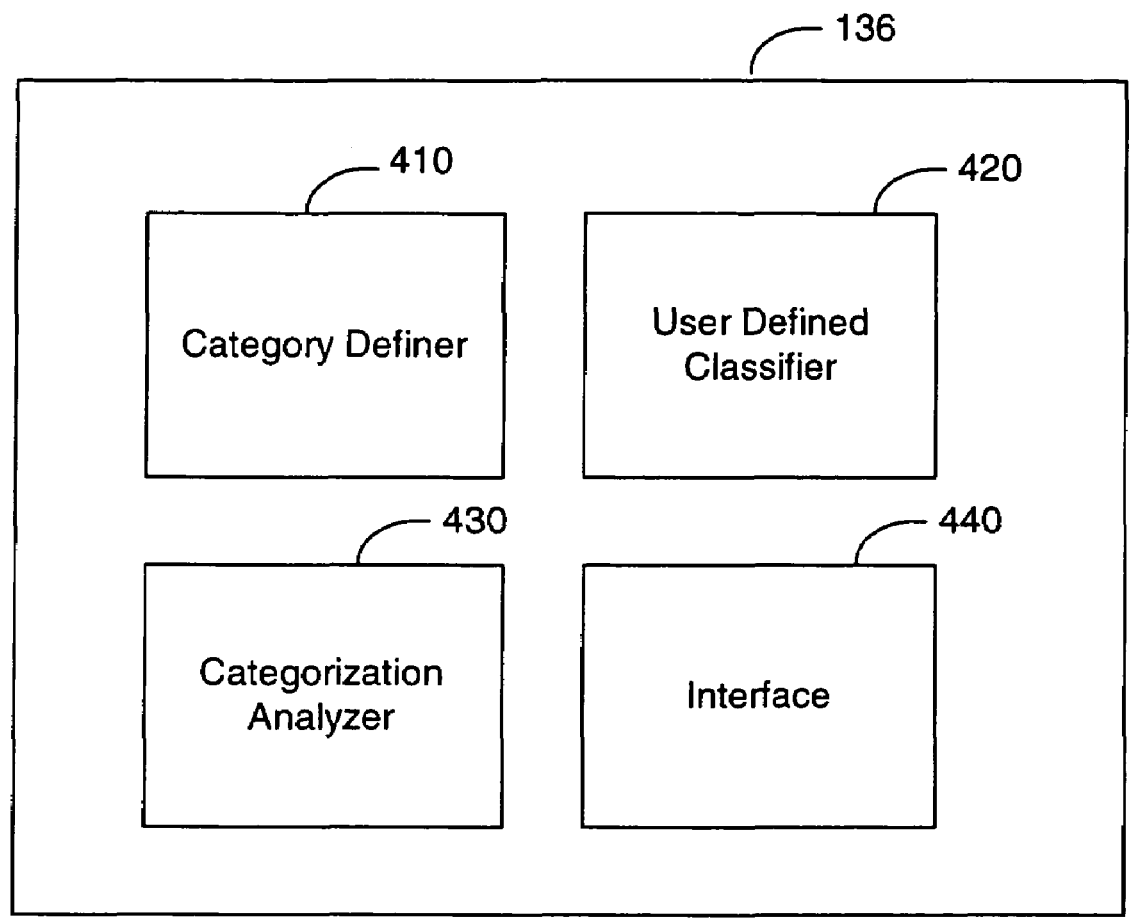
FIG. 4 illustrates an exemplary embodiment of a user-defined classification system according to an embodiment of the invention.

As shown in FIG. 4, a user-defined classification system 136 includes a category definer 410 that enables a user to define categories for classifying information associated with user action information. In a preferred embodiment, a user may access an interface 440, such as a graphical user interface ("GUI"), for establishing or defining categories. The defined categories may include a work-related category, a hobby-related category, a travel-related category, a non-work-related category, and any other category desired by the user. In a preferred embodiment of the invention, category definer 410 allows a user to create nested categories. For example, a non-work-related category may include a hobby-related category nested therein.

Once categories for user action information are defined, a user defined classifier 420 communicates with monitoring software 113 and/or monitoring software 132 to tag and store the information associated with user actions (that is gathered and stored by the monitoring software) according to one or more defined categories. In one embodiment, information associated with user action may be stored in a single log along with a defined classification for the information. In an alternative embodiment, information associated with user action may be stored in separate logs based on a defined classification for the information.

A categorization analyzer 430 allows information associated with user actions to be managed based on defined categories. For example, categorization analyzer 430 may leverage monitoring software 113 and/or monitoring software 132 to retrieve information related to one or more defined categories. Further, categorization analyzer 430 allows searches of user action information to be limited to search results that fall within a selected category. For example, a search conducted on a work-related category may produce search results from only the work-related category. In addition, categorization analyzer 430 may allows user action information to be displayed graphically, such as on a timeline, according to the selected category.

An interface 440 may be provided to display an output from categorization analyzer 430 to the user. The interface may include a video monitor or other device that is capable of displaying information. While separate components are illustrated in the embodiment shown in FIG. 4, one of ordinary skill in the art will readily appreciate that one or more components may be configured to perform these functions and that the functions may be performed using software or hardware components.

Figure 5:
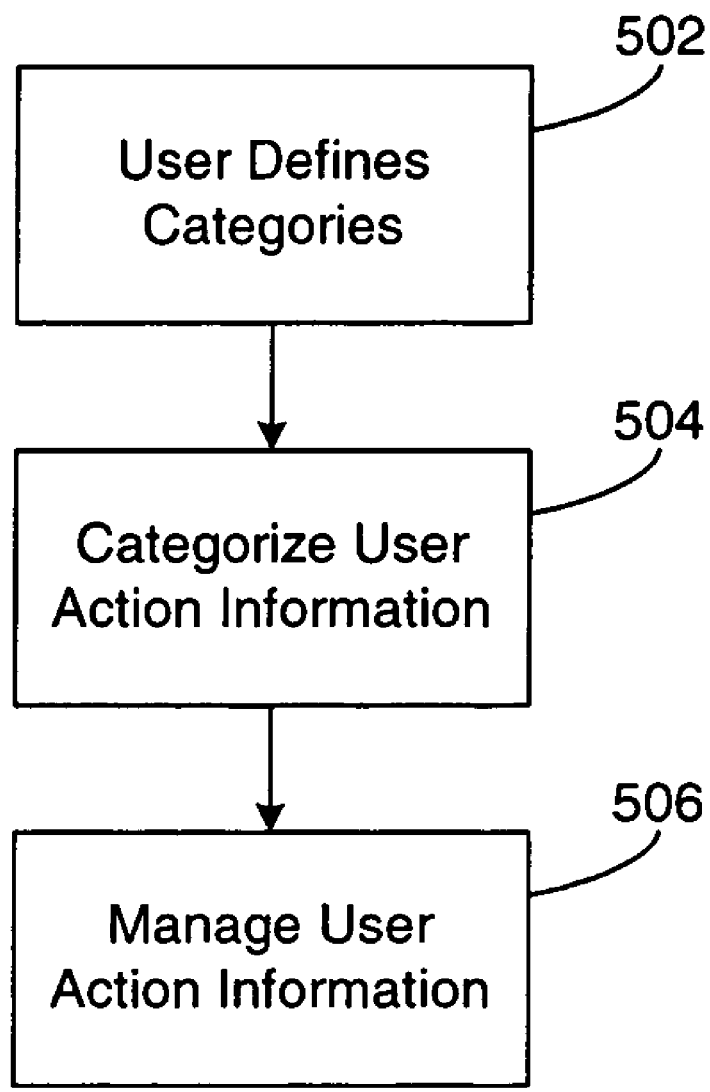
FIG. 5 illustrates a flow chart schematic for organizing and managing user action information according to an embodiment of the invention.

FIG. 5 depicts a process 500 for organizing and managing user action information, according to embodiments of the invention. In operation 502, a user may define one or more categories for monitoring information associated with user actions. The categories may include one or more areas in which the user is interested in obtaining relevant information regarding user action. For example, the defined categories may include one or more work-related categories, a hobby-related category, a travel-related category, a personal-related category, and other categories of interest. Categories may be nested within one another as described above. A user may define the categories at any time prior to using the categories.

After one or more categories are defined, information associated with user actions that is gathered by the monitoring software may be tagged and stored according to one or more defined categories in operation 504. In a preferred embodiment, all information is tagged and stored according to one or more defined categories. Information may be stored in a single log along with information regarding a defined classification. Alternatively, the information associated with user action monitoring may be stored in separate logs based on a defined classification.

In operation 506, information associated with user actions may be managed using the defined categories. Based on the classification of user action information into categories, a search on the user action information may be limited to search results that fall within a selected category. For example, a search conducted on the work-related category will not produce search results that are classified under a different category, such as a hobby-related category. Further, information associated with user actions may be retrieved based on the defined categories.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method for classifying activity performed on a computer system, comprising:

defining a plurality of categories for classifying, the activity performed on the computer system using at least one electronic device coupled to the computer system;

monitoring, by the at least one electronic device; the activity performed on the computer system, wherein the monitored activity includes a plurality of actions performed on the computer system and a plurality of objects accessed in the plurality of actions performed on the computer system;

determining, by the at least one electronic device a chronological timeline for the plurality of actions performed on the computer system, wherein the plurality of actions each occur at a respective chronological position in the chronological timeline;

inferring, by the at least one electronic device, one or more relationships between the plurality of objects and the plurality of actions in the chronological timeline, wherein the one or more inferred relationships are derived from the chronological positions for the plurality of actions in the chronological timeline; and classifying, by the at least one electronic device, each of the plurality of objects and each of the plurality of actions in one or more of the plurality of categories based on the one or more inferred relationships;

determining, by the at least one electronic device, a strength for each of the one or more inferred relationships based on one or more of frequencies, simultaneous occurrences, sequential occurrences, durations, or temporal proximities associated with the plurality of actions in the chronological timeline, wherein the one or more inferred relationships are inferred in response to determining that the strength for each of the one or more relationships exceed a threshold value; and displaying the one or more inferred relationships and their respective chronological positions in the chronological timeline on a display as a timeline.

2. The method according to claim 1, further comprising searching, by the at least one electronic device, the activity performed on the computer system for one or more of the plurality of actions that are classified in one or more of the plurality of categories.

3. The method according to claim 1, further comprising searching, by the at least one electronic device, the activity performed on the computer system for one or more of the plurality of objects that are classified in one or more of the plurality of categories.

4. The method according to claim 1, wherein a first one of the plurality of categories is nested within a second one of the plurality of categories.

5. The method according to claim 1, wherein the plurality of actions include one or more actions that the computer system performs and one or more actions that a user performs on the computer system.

6. The method according to claim 5, wherein the plurality of objects accessed in the plurality of actions include one or more of applications, documents, files, electronic mail messages, chat sessions, web sites, address book entries, or calendar entries.

7. The method according to claim 1, wherein at least one of the relationships are not inferred in response to determining that the strength for the at least one relationship does not exceed the threshold value.

8. The method according to claim 1, wherein the chronological timeline for the plurality of actions comprises a first chronological timeline for a first computer system, and wherein the method further comprises:

monitoring, by the at least one electronic device, activity performed on a second computer system, wherein the monitored activity performed on the second computer system includes one or more actions performed on the second computer system and one or more objects accessed in the one or more actions performed on the second computer system;

determining, by the at least one electronic device, a second chronological timeline for the one or more actions performed on the second computer system, wherein the one or more actions performed on the second computer system each occur at a respective chronological position in the second chronological timeline; and displaying, by the at least one electronic device, an aggregate timeline for the first computer system and the second computer system, wherein the aggregate timeline includes the plurality of actions performed on the first computer system and the one or more actions performed on the second computer system.

9. A system for classifying activity performed on a computer system, wherein the system comprises at least one electronic device configured to:

define a plurality of categories for classifying the activity performed on the computer system;

monitor the activity performed on the computer system, wherein the monitored activity includes a plurality of actions performed on the computer system and a plurality of objects accessed in the plurality of actions performed on the computer system;

determine a chronological timeline for the plurality of actions performed on the computer system, wherein the plurality of actions each occur at a respective chronological position in the chronological timeline;

infer one or more relationships between the plurality of objects and the plurality of actions in the chronological timeline, wherein the at least one electronic device derives the one or more inferred relationships from the chronological positions for the plurality of actions in the chronological timeline; and classify each of the plurality of objects and each of the plurality of actions in one or more of the plurality of categories based on the one or more inferred relationships;

determine, by the at least one electronic device, a strength for each of the one or more inferred relationships based on one or more of frequencies, simultaneous occurrences, sequential occurrences, durations, or temporal proximities associated with the plurality of actions in the chronological timeline, wherein the one or more inferred relationships are inferred in response to determining that the strength for each of the one or more relationships exceed a threshold value; and display the one or more inferred relationships and their respective chronological positions in the chronological timeline on a display as a timeline.

10. The system according to claim 9, wherein the at least one electronic device is further configured to search the activity performed on the computer system for one or more of the plurality of actions that are classified in one or more of the plurality of categories.

11. The system according to claim 9, wherein the at least one electronic device is further configured to search the performed on the computer system for one or more of the plurality of objects that are classified in one or more of the plurality of categories.

12. The system according to claim 9, wherein a first one of the plurality of categories is nested within a second one of the plurality of categories.

13. The system according to claim 9, wherein the plurality of actions include one or more actions that the computer system performs and one or more actions that a user performs on computer system.

14. The system according to claim 13, wherein the plurality of objects accessed in the plurality of actions include one or more of applications, documents, files, electronic mail messages, chat sessions, web sites, address book entries, or calendar entries.

15. The system according to claim 9, wherein at least one of the relationships are not inferred in response to determining that the strength for the at least one relationship does not exceed the threshold value.

16. The system according to claim 9, wherein the chronological timeline for the plurality of actions comprises a first chronological timeline for a first computer system, and wherein the at least one electronic device is further configured to:

monitor activity performed on a second computer system, wherein the monitored activity performed on the second computer system includes one or more actions performed on the second computer system and one or more objects accessed in the one or more actions performed on the second computer system;

determine a second chronological timeline for the one or more actions performed on the second computer system, wherein the one or more actions performed on the second computer system each occur at a respective chronological position in the second chronological timeline; and display an aggregate timeline for the first computer system and the second computer system, wherein the aggregate timeline includes the plurality of actions performed on the first computer system and the one or more actions performed on the second computer system.

* * * * *